US012770036B2

(12) United States Patent
Chuang

(10) Patent No.: US 12,770,036 B2
(45) **Date of Patent: *Oct. 20, 2026**

(54) ARTIFICIAL INTELLIGENCE ANNOTATION THROUGH GAMIFICATION

(71) Applicant: Wesley T. Chuang, Vienna, VA (US)

(72) Inventor: Wesley T. Chuang, Vienna, VA (US)

( * ) Notice: Subject to any disclaimer, the term of this patent is extended or adjusted under 35 U.S.C. 154(b) by 181 days.

This patent is subject to a terminal disclaimer.

(21) Appl. No.: 18/898,836

(22) Filed: Sep. 27, 2024

(65) Prior Publication Data

US 2025/0021838 A1 Jan. 16, 2025

Related U.S. Application Data

(62) Division of application No. 17/221,994, filed on Apr. 5, 2021, now Pat. No. 12,118,479.

(60) Provisional application No. 63/037,688, filed on Jun. 11, 2020.

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 12,337,227 | B2 * | 6/2025 | Law | A63F 13/63 |
| 2018/0169514 | A1 | 6/2018 | Gonzalez | |
| 2021/0299573 | A1 | 9/2021 | Pourabolghasem et al. | |
| 2022/0279223 | A1 * | 9/2022 | Tofighbakhsh | G06V 20/41 |
| 2022/0342926 | A1 | 10/2022 | Zeiler et al. | |
| 2025/0232224 | A1 * | 7/2025 | Beuzeville | G06N 20/00 |
| 2025/0337653 | A1 * | 10/2025 | Somasundaram | H04L 41/12 |

* cited by examiner

*Primary Examiner* — Ronald Laneau
(74) *Attorney, Agent, or Firm* — BACON&THOMAS,PLLC

(57) ABSTRACT

In a system and method of labeling or annotating entities or objects in a data stream, the data is displayed in a virtual game environment, and the identification and labeling tasks are carried out by players of the game through game input devices capable of selecting an object or entity displayed in the game environment, and of categorizing the object or entity upon selection.

17 Claims, 9 Drawing Sheets

Traditional Annotation for Text

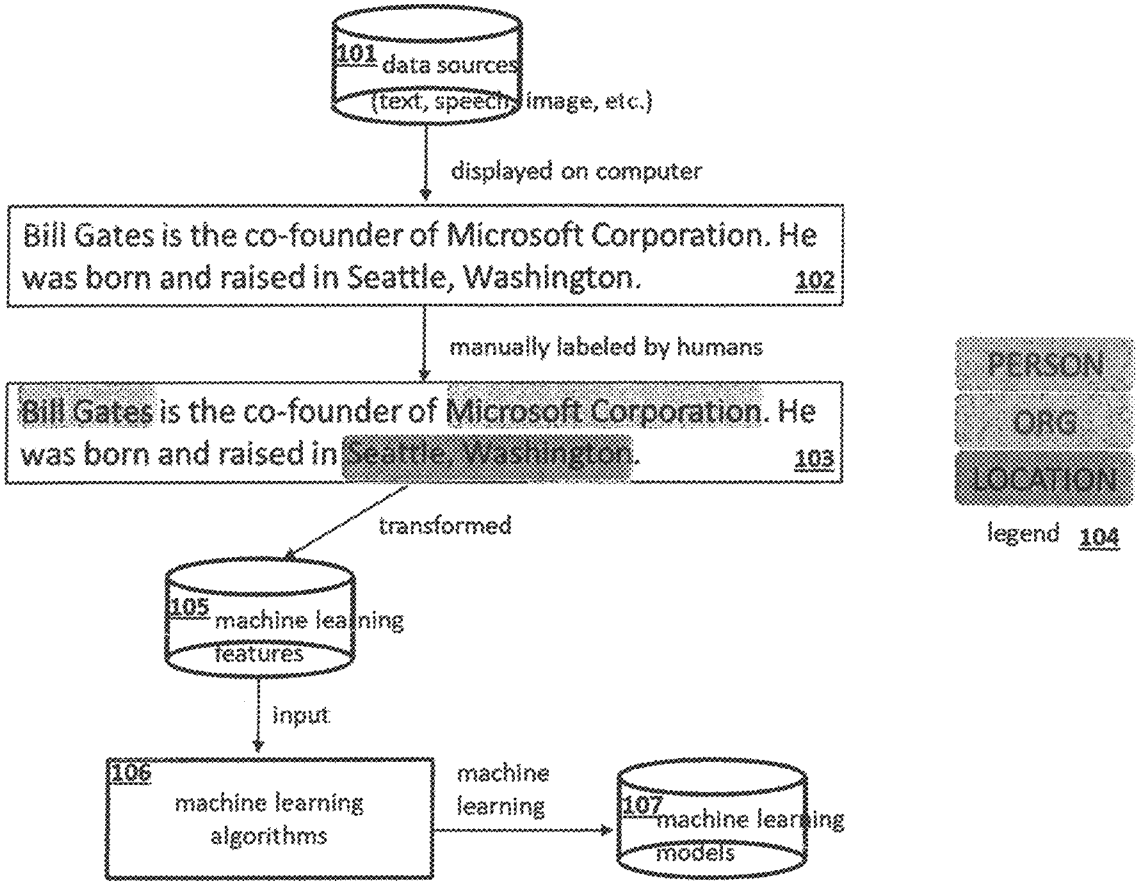
Figure 1 Traditional Annotation for Text

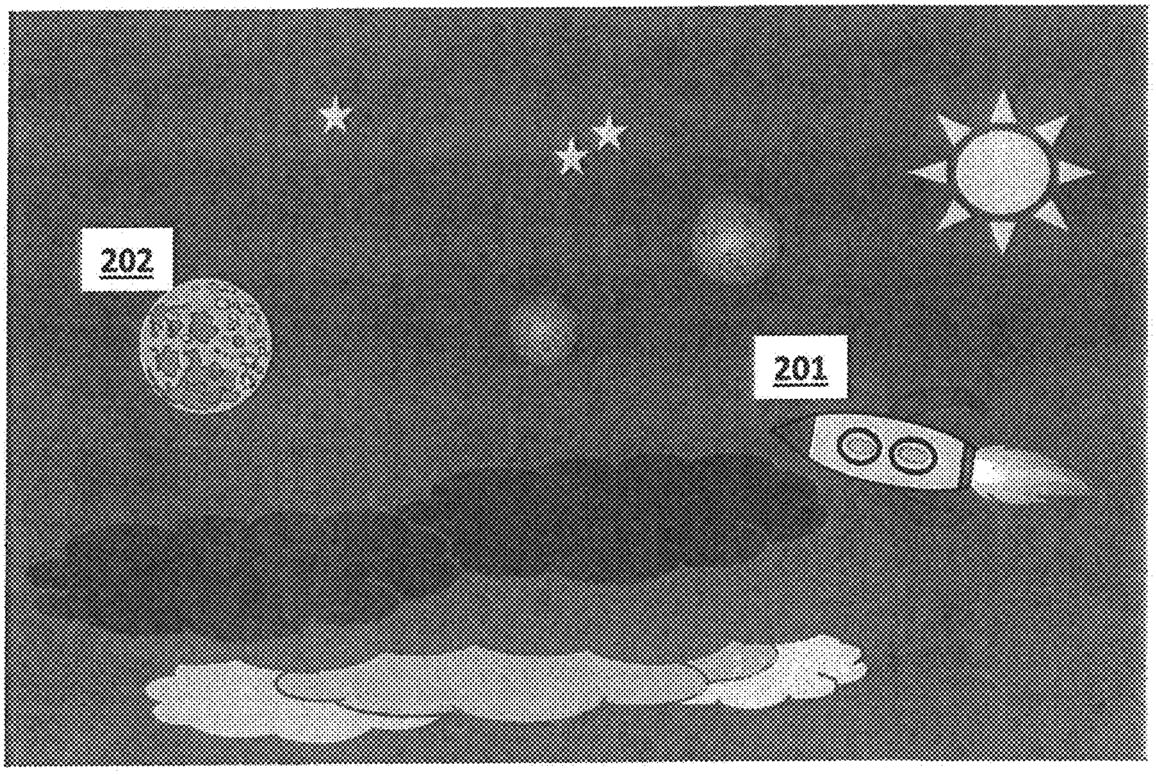
Figure 2 New Annotation Video Game Starts Up

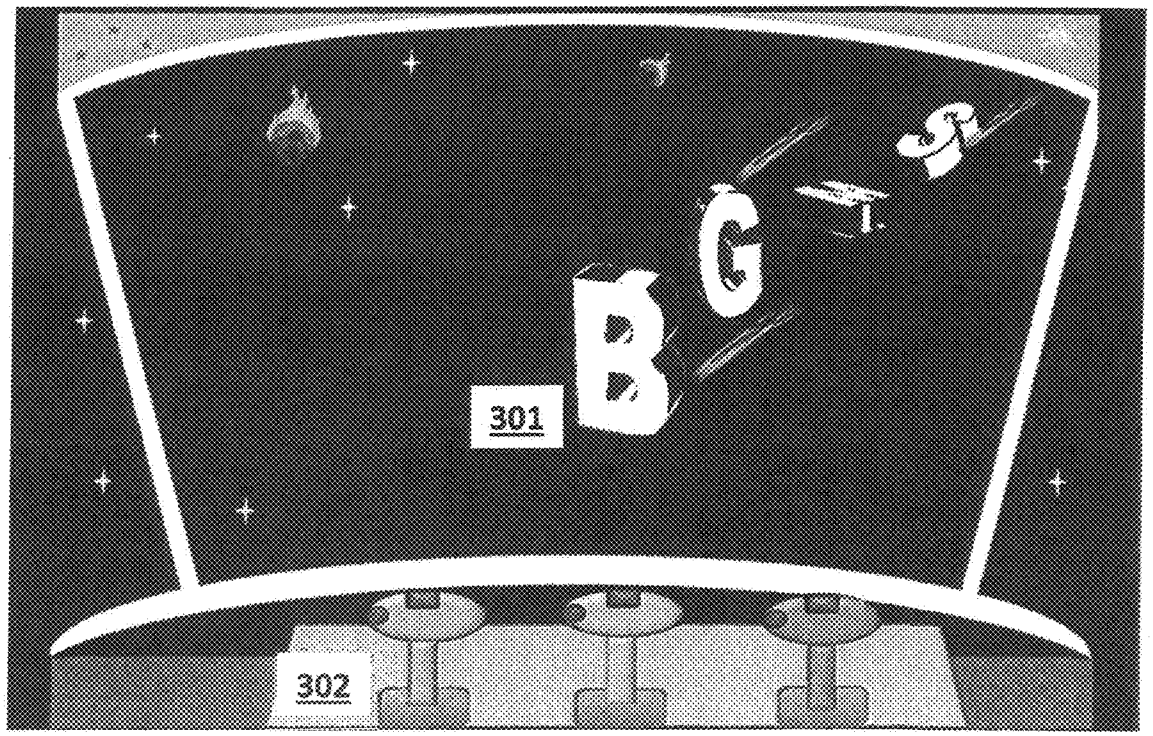
Figure 3 Gaming Initial Objects
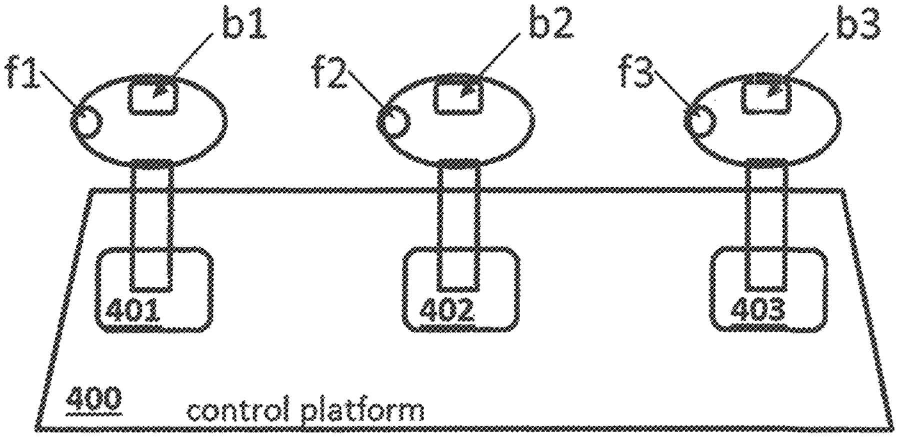
Figure 4 Video Game Control Platform

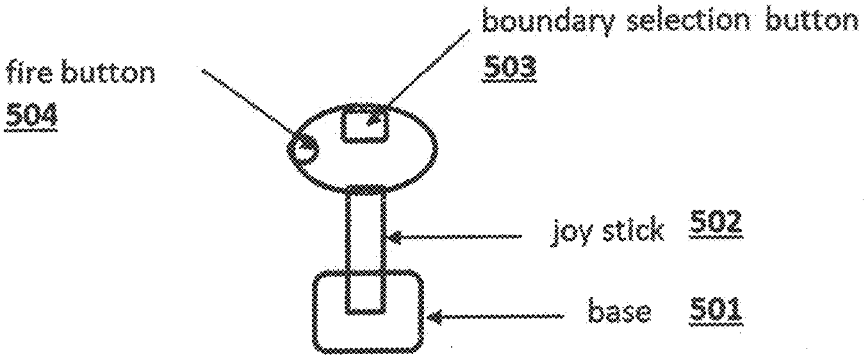
Figure 5 Joy Stick Components
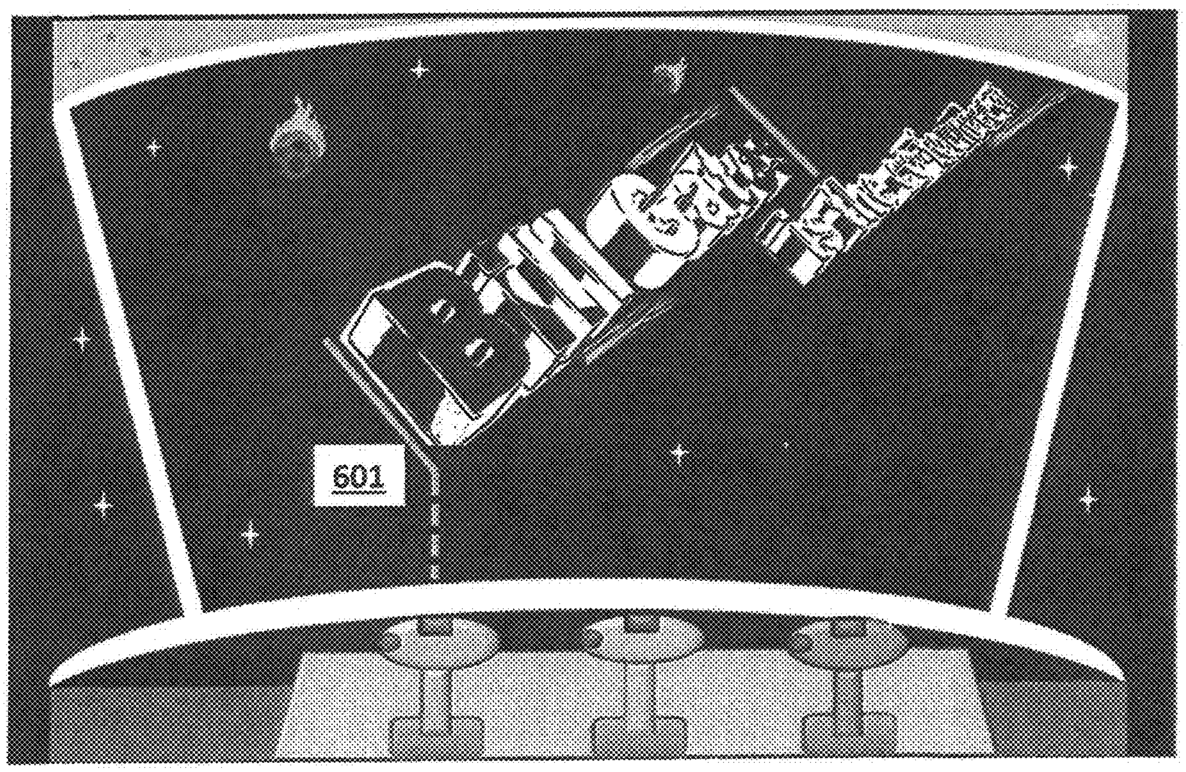
Figure 6 Text Approaching and Selection

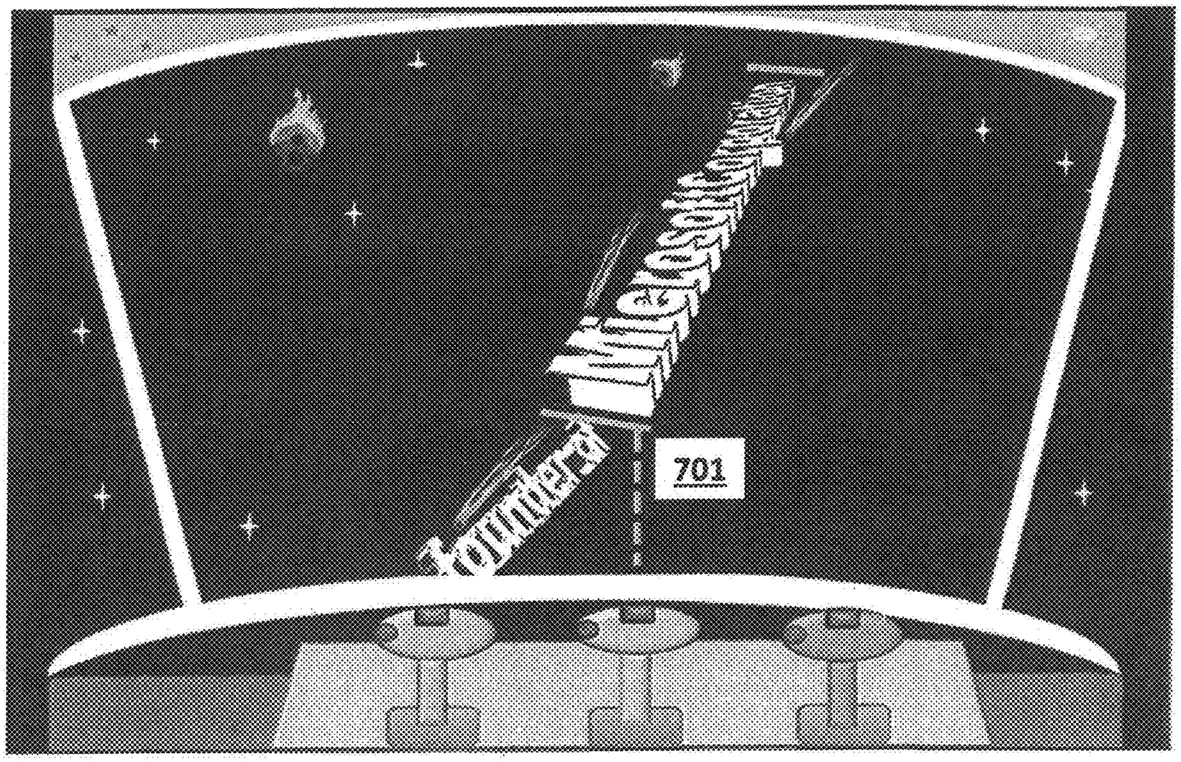
Figure 7 Text Selection with a Different Category

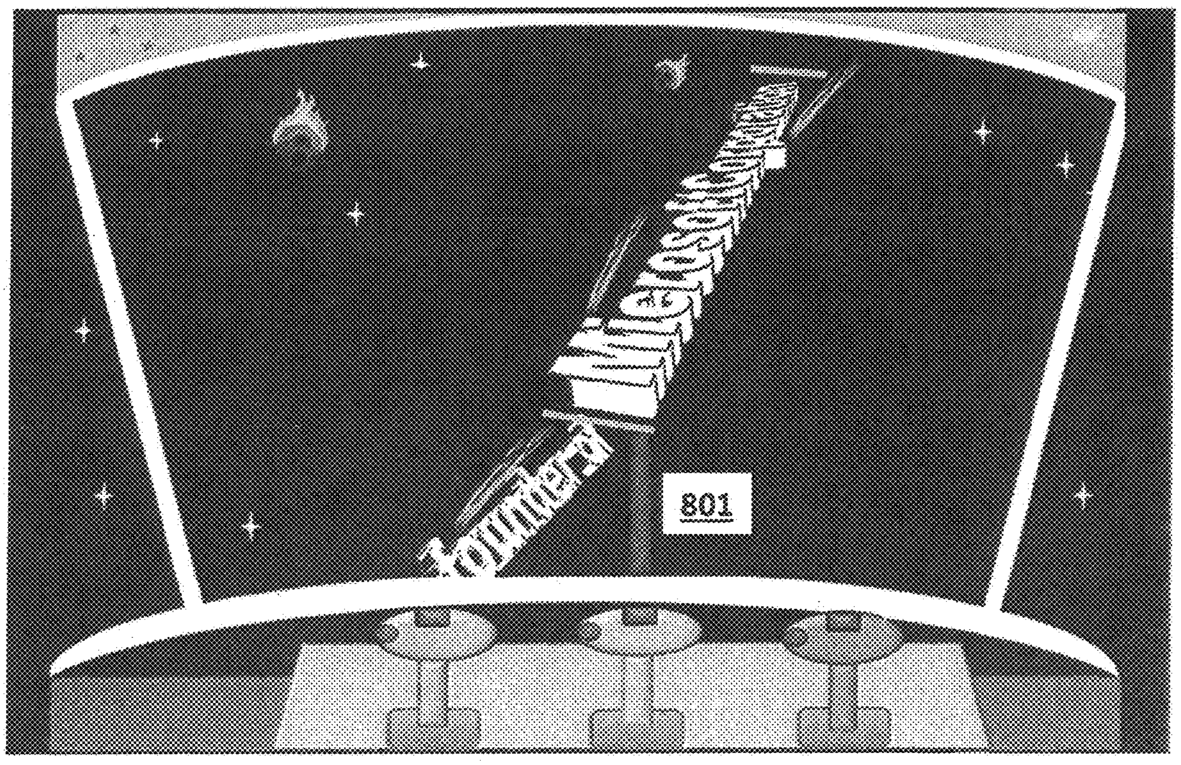
Figure 8 Text Label Being Fired At

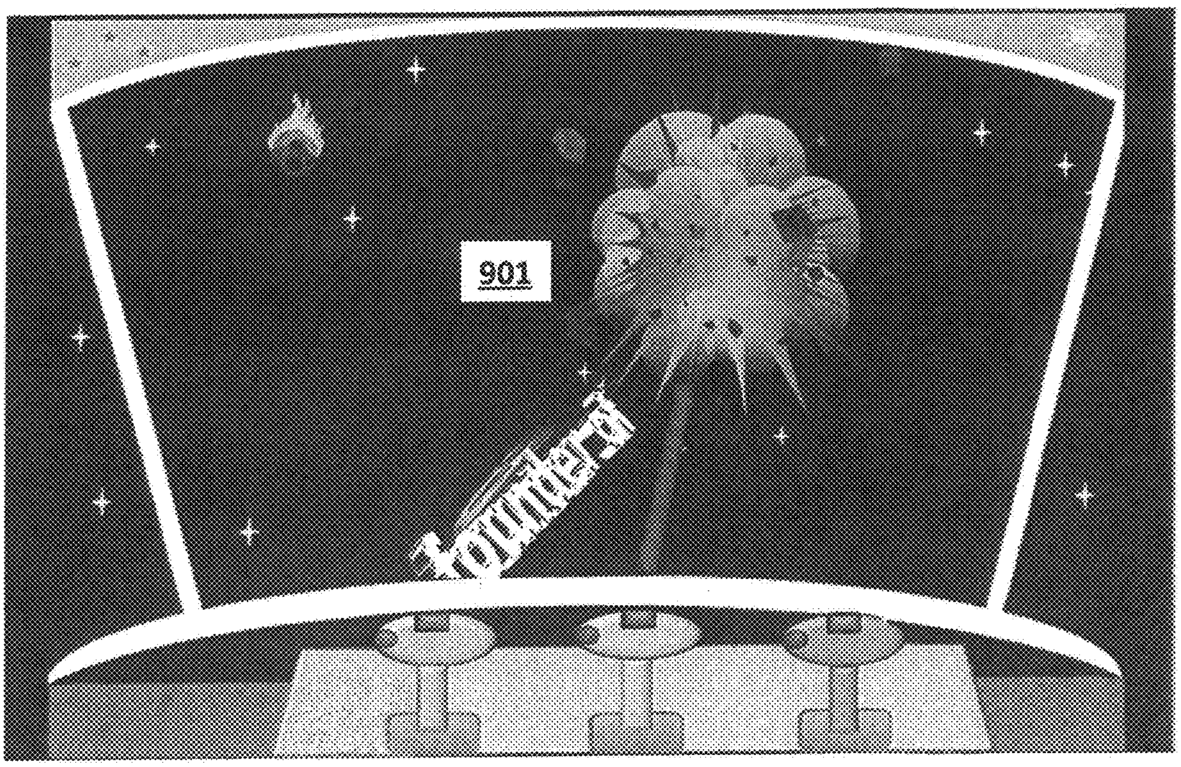
Figure 9 Part of Text Exploded (Labeled)

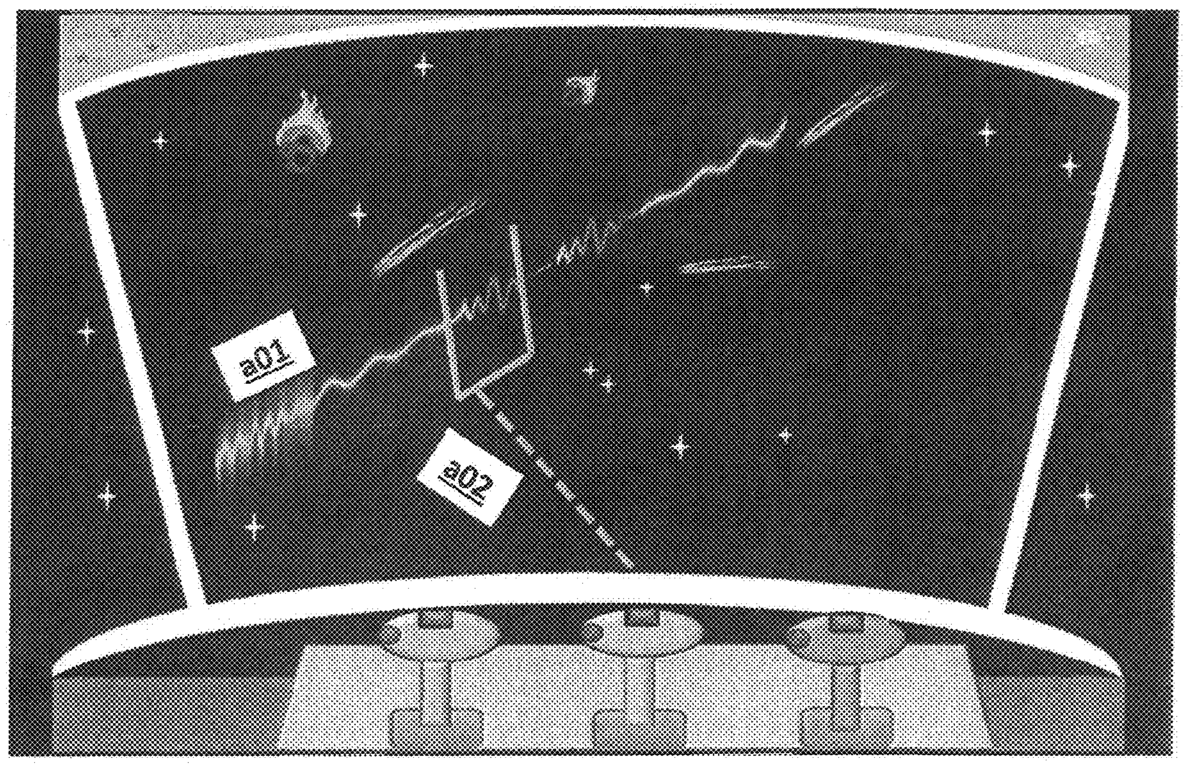
Figure 10 Labeling Speeches
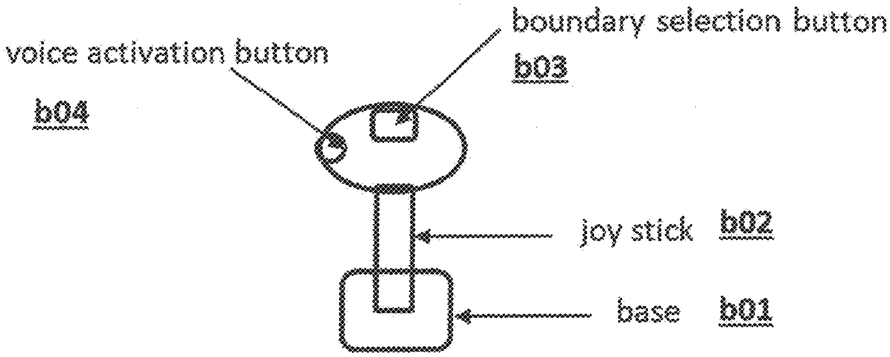
Figure 11 Joy Stick Control for Voice and Image

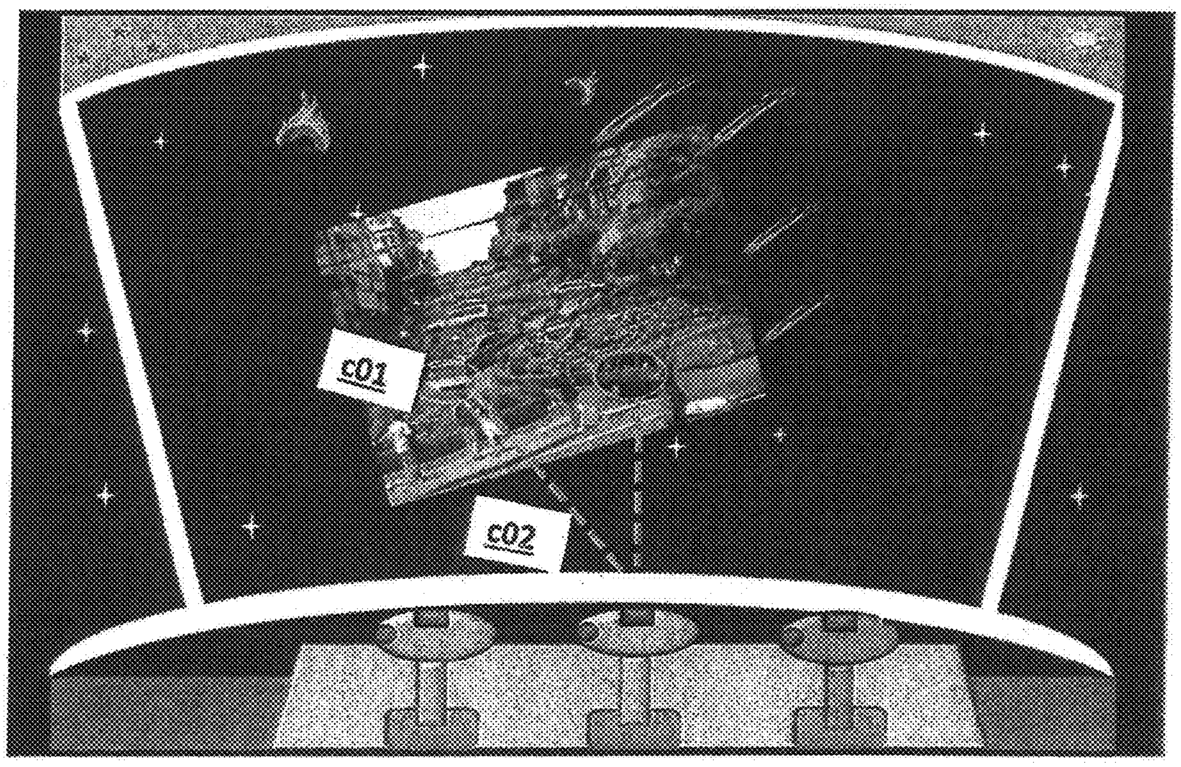
Figure 12 Labeling Images

ARTIFICIAL INTELLIGENCE ANNOTATION THROUGH GAMIFICATION

BACKGROUND OF THE INVENTION

This application is a divisional of U.S. patent application Ser. No. 17/221,994, filed Apr. 5, 2021, which claims the benefit of U.S. Provisional Patent Appl. Ser. No. 63/037,688, filed Jun. 11, 2020, each of which is incorporated herein by reference.

1. FIELD OF THE INVENTION

The invention relates to training of an artificial intelligence system to identify visual or audible inputs or other stimuli, and in particular to labeling or annotation of entities or objects in a data stream for use in training or teaching the artificial intelligence system to recognize the entities or objects.

More particularly, the invention relates to a method and system for labeling or annotating the visual or audible inputs or stimuli by using "gamification" to entice large numbers of users to carry out the labeling or annotation, thereby achieving mass participation to increase the speed and accuracy of the training or teaching process.

The term "gamification" refers to the application of elements of game playing to areas of activity other than games, and specifically to labeling or annotation of objects or elements in a data stream for the purpose of training an AI system to recognize the objects or elements. The elements of game playing that may be applied include both game-design elements and game principles such as, by way of example and not limitation, presenting the data in an entertaining, interactive format or virtual environment, point scoring, and competition with others based on predetermined rules of play.

2. DESCRIPTION OF RELATED ART

Gamification is a known online marketing technique to encourage engagement with a product or service. However, it has not previously been applied to arduous task of applying labels or annotations to entities or objects in a data stream, for the purpose of training or teaching an artificial intelligence (AI) system to recognize the entities or objects.

Artificial intelligence (AI) training typically involves inputting various stimuli to a learning network or algorithm, comparing outputs with expected outputs, and responsively adjusting internal connections and processing elements or the machine learning algorithm until the outputs match or are acceptably close to the expected outputs. There are a variety of machine learning algorithms, which are used to build AI "models" that recognize patterns or simulate what humans do better than computers. One such AI model is the "Artificial Neural Network," which is inspired by the manner in which biological neurons work in the human brain. In the case where the network is being trained to recognize visual or audible entities in a data stream input to the AI network, the responses of the network to the unlabeled data stream input are compared with target responses based on labels or annotations applied by human users to entities or objects recognized by human users in the data stream.

In order to apply the labels or annotations, it is necessary for humans to observe the data source, identify entities or objects to be labeled, and manually associate the labels or annotations with the identified entities or objects. To be useful, the AI system must recognize all objects or entities that are potentially present in the data stream. This can be a very large number, requiring thousands of man-hours to achieve the necessary labeling or annotation. For example, an AI system used to control a vehicle must recognize vehicles, roadside markings, pedestrians, and so forth. An AI system designed to converse with a human must have a vocabulary equal to that of the person with which it is intended to converse, typically at least the twenty to thirty thousand most commonly used words. Because such labeling or annotation must be carried out by human operators, the task of labeling is not only tedious and time consuming, but also prone to human error.

While increasing the number of persons carrying out the labeling can reduce training time and the effects of human error, recruiting more skilled programmers to carry out the labeling greatly increases costs.

The present invention seeks to accomplish the task of identifying and labeling objects or entities in a data source such as a text, audio, or video stream, by transforming the task of labelling or annotation into an activity that will attract multiple distributed users who voluntarily carry out the labeling and annotation for minimal or no compensation, eliminating the need for large numbers of high cost skilled programmers while reducing training time and allowing error-reducing redundancies due to the large number of participants.

In order to entice users into participating, the invention transforms the labeling or annotation task into game play, with players being rewarded for participation by scores or prizes based on how well they address challenges or goals presented by the game. The manner in which game play is judged or assessed for purposes of rewarding the player in an artificial intelligence game play application is known as its "ground truth" of the game application, also known as the answer keys. However, the use of gamification to apply labels or annotations presents an initial problem. The problem is that the labels or annotations, i.e., the answer keys, are exactly what players are expected to provide. To resolve this chicken-or-egg causality dilemma, an initial ground truth in the form of a small set of labels or annotations must be established to provide criteria for judging player-applied labels or annotations at the start of game play. This initial ground truth can be provided, depending on the nature and complexity of the game, by manual input of a trusted game designer(s) or an initial population of users, or by pattern recognition software. The initial ground truth can then be used to build a baseline model which in turn generates more answer keys (treated as semi-ground truth) on top of answer keys from human players, in a manner analogous to a democratic voting system that gradually improves by aggregating players' opinions and feedback from previous machine learning models with volume increased iteratively to an "asymptotic" truth. Both the human players and AI machine learning algorithms contribute to the model improvement.

SUMMARY OF THE INVENTION

It is accordingly a first objective of the invention to provide a labeling or annotating system and method that reduces costs and time required to train an AI system to recognize the entities and objects in a data stream.

It is a second objective of the invention to provide a system and method for obtaining mass participation in the labeling or annotation of entities or objects extracted from a data stream, for use in training an artificial intelligence system.

It is a third objective of the invention to gamify the task of labeling or annotating entities and objects in a data stream, in order to recruit large numbers of volunteer labelers or annotators, and thereby enhance AI training efficiency and accuracy.

These and other objectives are achieved, in accordance with the principles of a preferred embodiment of the invention, by a system and method of labeling or annotating entities or objects in a data stream, in which the data is displayed in a virtual game environment, and the identification and labeling tasks are carried out by players of the game through game input devices capable of selecting an object or entity displayed in the game environment, and of categorizing the object or entity upon selection. The game environment display and input devices may utilize hardware such as a computer monitor or television and game input devices such as joysticks, keyboards, or cursor controllers, but also may be implemented by gaming systems that sense player movements, gestures, or speech, or by a unitary device such as a smartphone or portable game player.

According to an illustrative embodiment of the invention, for example, the input devices embodied by a virtual reality gaming application may include one or more joystick elements, each of which includes a stick for rotating and aiming at targets from different directions; a boundary selection button for scoping the target object, and a fire button for simulating shooting of the intended entity or object.

The entities or objects to which the method and apparatus of the invention may be applied may include, in the illustrated embodiment, natural language text to be tagged with entity classes, parts of speech or other prominent natural language features; speech voice to be recognized or translated into text; and images to be identified and recognized as the intended categories.

The labels and/or annotations can each be converted to machine learning features, and be fed to various machine learning algorithms for producing machine learning models that predict the labels and/or annotations applied during game play. For example, the machine learning text model can perform Named Entity Recognition (NER), parts-of-speech identification, and so forth, from a text data stream. A machine learning speech model can recognize speech sounds to represent certain natural language words, phrases or sentences, English or foreign languages. Finally, a machine learning image model can recognize images or their parts and categorize them as belonging to specific genres.

For text, the labels can be embodied in gamification as entities or objects that, as part of the game, may be scoped and aimed at by manipulating the joystick, and fired upon or shot down by pressing the joystick buttons associated with categories to which the objects or entities are to be assigned. For speech, the labels can be embodied in gamification as a sound wave that can be aimed at, heard by gaming participants, and responded to with a human voice. For images, the labels can be embodied in gamification as moving images that may be scoped, aimed at, fired upon and shot down by the designated joystick categories, buttons or human voice.

In order to provide criteria for judging player-applied labels or annotations at the start of game play, an initial "ground truth" or set of judging criteria may be established by manual input by a trusted game designer(s) or an initial population of users, or by pattern recognition software. The initial ground truth can then be used to build a baseline model which in turn iteratively generates more answer keys on top of answer keys from human players, so that both the human players and AI machine learning algorithms contribute to the model improvement.

According to a particularly advantageous aspect of the illustrated embodiments, the virtual environment that provides the backdrop for the objects or entities, and in which the objects or entities are displayed, can utilize a variety of virtual reality themes for video games, such as outer space, deep sea, and earth terrain with multimedia (sound and visual) effects to promote human competition and gratification, which in turn will effectively solicit better and more accurate labels or annotations. The labeling or annotation can be carried out by a series of delta improvements by a variety of game players, and with successive and incremental learning cycles.

According to another particularly advantageous aspect of the illustrated embodiments, the models being created for text, speech and images may be arranged to generate monetizing outcome. This is based on the fact that machine learning models extracted from human intelligence are better than random acts or baseline models and that the competition nature of gamification increases the model accuracy, and therefore the revenue generated by the models. According to this aspect of the invention, the more accurate the model generated, the more the revenue that can be distributed to game players to further incentivize their participation. As a result, gaming participants will benefit from the model profit more than they would by paying for the game applications, further attracting more participants, and thereby creating more revenue and further improvement in the machine learning models.

BRIEF DESCRIPTION OF THE DRAWINGS

FIG. 1 is a schematic diagram of a conventional text annotation system and method.

FIG. 2 illustrates a display presented during start-up of a new annotation video game according to an illustrative embodiment of the present invention.

FIG. 3 illustrates a second display, taken at a time following the first display, in which a plurality of text objects are initially presented.

FIG. 4 is a schematic diagram of a labeling or annotation input device, in the form of a set of joysticks, for use in the illustrative embodiment of the invention.

FIG. 5 is a schematic diagram of one of the joysticks of FIG. 4.

FIG. 6 is a third display, taken at a time following the display of FIG. 3, in which a recognizable text object is displayed for categorization by the game player.

FIG. 7 is a fourth display, showing a different recognizable text object for categorization into a different category than the text object of FIG. 6.

FIG. 8 is a fifth display, taken at a time shortly after the fourth display, showing that the text object has been "fired at" to categorize the object, based on the button selected to carry out the firing.

FIG. 9 is a sixth display, taken at a time shortly after the sixth display, showing the manner in which the game player is "rewarded" for skill in aiming and firing at the object, thereby achieving a categorization.

FIG. 10 illustrates a display for use in a second preferred embodiment of the invention, in which parts of speech are categorized.

FIG. 11 is a schematic diagram of an input device in the form of a joystick for use in connection with the preferred embodiment of FIG. 10.

FIG. 12 illustrates a display for use in a third preferred embodiment of the invention, in which images are labeled.

DETAILED DESCRIPTION OF THE PREFERRED EMBODIMENTS

FIG. 1 illustrates how labeling is used to provide inputs to an AI system. The objective of the labeling in this example is to teach the system to analyze text objects or entities present in a text data stream.

As illustrated in FIG. 1, a data source 101 provides an input in the form of text for the AI system to learn how to analyze. In the illustrated example, the input is a text block 102 that reads "Bill Gates is the co-founder of Microsoft Corporation. He was born and raised in Seattle, Washington." The AI system 105 is to be taught how to recognize persons, organizations, and locations mentioned in the task block, as indicated by legend 104. In order to determine whether the AI system 105 has correctly identified the person, organization, and location mentioned in the text block, the text block must be labeled.

Conventionally, labeling is accomplished by having a programmer or teacher select the respective items and apply a label, for example by using a mouse to select or highlight the item and then click on one of the categories displayed in the legend, as illustrated in block 103. In practice, this labeling procedure must be repeated a very large number of times, until the AI system has learned from its successes and failures in labeling the items and comparing the labels with those applied by the programmer or teacher. Once the text is labeled, it is input to the AI system 105, which then utilizes the labeled input in machine learning algorithms to produce machine learning models 107 that carryout various AI tasks, such as Named Entity Recognition (NER), parts-of-speech identification, and so forth, in relation to the text data.

Alternatively, using systems similar to the system illustrated in FIG. 1, machine leaning speech models can be used to recognize speech sounds to represent certain natural language words, phrases or sentences, English or foreign languages, while machine learning image models can be used to recognize images or their parts and associate them with specific genres. The present invention is to apply to any such learning models, without limitation to the type of data that is to be analyzed.

As shown in FIG. 1, data sources 101 such as text, speech, or images are first displayed on a computer. FIG. 1 shows the example of a text sentence 102, before annotation. The exemplary sentence is then manually labeled in block 103 by humans to reflect certain named entities as highlighted by colors from legend 104. The resulting labels are then transformed into input features 105, and fed into machine learning algorithms 106, for producing machine learning models 107. Different data types and their models can all be implemented by following steps similar to this approach.

FIG. 2 illustrates a preferred labeling method in which gamification by displaying the text in a virtual game environment. Themes for the game environment can include, by way of example and not limitation, outer space, deep sea, and earth terrain with multimedia (sound and visual) effects to promote human competition and gratification. The themes are chosen to effectively solicit better and more accurate annotations. The example in FIG. 2 has the theme of a spaceship 201 on a mission to an exoplanet 202, while fending off asteroids represented by text flying towards the ship.

In essence, the purpose of gamification is to transform the text block 103 of FIG. 1 into something more interesting, while still requiring humans to annotate the transformed text. Instead of the full text display in block 103 in FIG. 1, the game can initially display only the first letters 301 of the incoming texts as they are flying in from afar in the form of asteroids, as illustrated in FIG. 3. As these texts become more and more visible, game control panel 302 and its components will be used to annotate them, the goal being to do so as quickly as possible by having the game player select and fire at the text as soon as the complete text block appears, thus challenging the game players reflexes and ability to quickly recognize the text.

Further challenges may be provided by varying the direction, speed, shape, or nature of the objects or entities as they appear on the display screen, either randomly or according to physical "laws" of the virtual environment in which the objects or entities are presented, in a manner similar to the Asteroids™ video game released by Atari in 1979. Such randomization or variations can be used to maintain interest in the game and to enhance the virtual environment in which the game is played.

As incoming text objects or entities, with asteroids and sound effects, fly closer, gamers can utilize the video game control platform shown in FIG. 4 to annotate the text. Specifically, in this example in FIG. 4, 401 will be used to annotate the text segment of a PERSON, 402 to annotate the text segment of an ORGANIZATION, and 403 to annotate the text segment of a LOCATION.

FIG. 4 shows the video control platform that serves as the annotation input device, with which the oncoming text can be manipulated. Such a control platform can be implemented as separate hardware, connected to the gaming software, or emulated directly from gaming software residing in a computer or tablet.

FIG. 5 shows one of the joysticks 401 of FIG. 4, as applied to the scenario in FIG. 6. By pivoting joystick handle 502 with respect to a pivot in base 501, users are enabled to aim at and select incoming text segments with button 503. As shown in FIG. 6, pressing of selection button 503 causes a selection beam 601 to appear in the display and enclose the text segment, whose category is a PERSON. Similarly, using joystick 402 of FIG. 4, as applied to the scenario in FIG. 7, pivoting joystick 502 about a pivot in base 501 enables users to aim at and select another incoming text segment with button 503. The selection beam 701 encloses text segment, whose category is an ORGANIZATION. In both cases, when ready, hitting button 502 will emit a laser beam 801 in FIG. 8 aiming at the target text segment, making the target 901 in FIG. 9 explode and disappear. This effectively labels the respective text segment.

FIG. 10 concerns labeling speech waveforms with a user's voice, while FIG. 12 demonstrates a system for labeling images with the intended categories. Both involve similar treatments as compared to text, except that the joystick functions change slightly. As shown in FIG. 11, the selection button b03 works as before. However, hitting the voice activation button b04 will allow the user to respond with his or her voice, to indicate the correct categories by speaking out loud.

As a final step, the labeled text, speech, image objects or entities are converted into machine learning features as indicated by block 105 in FIG. 1, the remaining blocks being implemented in conventional fashion.

Although specific examples of gamification are described above in connection with the appended figures, it will be appreciated that the principles of the invention may be applied to a variety of virtual game environments and game play scenarios. All such modifications of the illustrated embodiments are intended to be included within the scope of the invention, which should be limited solely by the appended claims.

For example, game players can be rewarded with cash "prizes" based on model accuracy. According to this aspect of the invention, the more accurate the model generated, the more the revenue that can be distributed to game players to further incentivize their participation.

In addition, in order to provide criteria for judging player-applied labels or annotations at the start of game play, an initial "ground truth" or set of judging criteria may be established by manual input by a game designer or initial population of users, or by pattern recognition software. After game play has begun, the labels or annotations input during game play may optionally be used to gradually improve the ground truth by aggregating players' opinions and feedback from previous machine learning models with volume increased iteratively to an "asymptotic" truth, so that both the human players and AI machine learning algorithms contribute to the model improvement.

Still further, although the illustrative system includes a television or computer monitor type display and separate joystick input devices, it will be appreciated that the invention could alternatively be implemented on a smartphone or other device having an integrated display and inputs, as well as a system that responds to movements, gestures, or any combination of movements, gestures, and inputs such as voice commands.

I claim:

1. A system for training an artificial intelligence (AI) to recognize virtual reality objects by enticing users to label the virtual reality objects, comprising:

a server connected to a network and configured to broadcast a data stream over the network to a plurality of computing devices, the data stream including, in a virtual game environment, objects or entities recognizable by users of the computing devices, wherein the computing devices are configured to:

display, on display devices connected to respective said computing devices, the objects or entities included in the data stream, enable users, in response to the display of one of the objects or entities included in the data stream, to play video games by manipulating or utilizing computer input devices to select and label, in a manner consistent with the virtual game environment, the displayed objects or entities, communicate, via the network, labels selected by the user for the displayed object or entity from the computing devices to the AI for use in training the AI and increasing model accuracy by identifying the object or entity based on labels input by multiple said users through the plurality of computing devices;

upon selection of a label by a respective user, display a result, consistent with the virtual game environment, that rewards the respective user for carrying out the selection and labeling in order to entice the user into continuing to select and label displayed objects, and thereby train the AI to recognize the displayed objects or entities included in said data stream and broadcast over the network.

2. The system as claimed in claim 1, wherein the computer input devices include game controllers, and the game controllers are configured to enable the users to associate the objects or entities with a category by manipulating the game controllers to select one of the objects or entities, and to categorize the selected one of the objects or entities by pressing one of a plurality of buttons on the game controllers, each button associated with a different category.

3. The system as claimed in claim 1, wherein the computing devices are configured to label the objects or entities by associating the objects or entities with a category.

4. The system as claimed in claim 3, wherein the computer input devices include at least one button configured to enable the users to select one of the objects or entities, and additional buttons configured to enable the users to categorize the selected one of the objects or entities.

5. The system as claimed in claim 4, wherein the input devices include video game input devices.

6. The system as claimed in claim 5, wherein the video game input devices are joysticks.

7. The system as claimed in claim 6, wherein the joysticks each includes a button for selecting one of the objects or entities after a marker representing an aiming beam is positioned by the joystick.

8. The system as claimed in claim 1, wherein the objects or entities include text objects.

9. The system as claimed in claim 8, wherein the computing devices are configured to display parts of the text objects before displaying the entire text objects.

10. The system as claimed in claim 1, wherein the objects or entities include speech waveforms.

11. The system as claimed in claim 10, wherein the computing devices are configured to enable the users to categorize the speech waveforms as parts of speech.

12. The system as claimed in claim 1, wherein the objects or entities include images.

13. The system as claimed in claim 1, wherein the computing devices are configured to enable users to categorize each of the objects or entities as a person, organization, or location.

14. The system as claimed in claim 1, wherein the computing devices are configured to cause variations in a direction or speed of displayed objects or entities.

15. The system as claimed in claim 14, wherein the variations are random.

16. The system as claimed in claim 1, wherein the input devices are microphones that enable the users to select and label the objects by voice commands.

17. The system as claimed in claim 1, wherein the server and/or computing devices are further configured to offer monetary rewards to the users based on an accuracy of a model generated in response to the selection and labeling carried out by the users.

* * * * *